United States Patent [19]

Yang

[11] Patent Number: 5,080,117
[45] Date of Patent: Jan. 14, 1992

[54] DEVICE FOR CLEANING CONTACT LENSES

[76] Inventor: Wen-Ho Yang, 3rd Fl., No. 68, Chung-I St., Shih-Lin Dist., Taipei, Taiwan

[21] Appl. No.: 521,113

[22] Filed: May 3, 1990

[51] Int. Cl.[5] .............................. B08B 3/04
[52] U.S. Cl. ......................... 134/188; 134/901
[58] Field of Search ............ 206/5.1; 134/901, 184, 134/188

[56] References Cited

U.S. PATENT DOCUMENTS

| | | | |
|---|---|---|---|
| 3,614,959 | 10/1971 | Schollmaier et al. | 206/5.1 |
| 3,621,855 | 11/1971 | Rabinowitz | 206/5.1 |
| 3,623,492 | 11/1971 | Frantz et al. | 206/5.1 |
| 3,856,571 | 12/1974 | Sherman | 206/5.1 X |
| 4,228,136 | 10/1980 | Thomas | 206/5.1 X |
| 4,328,890 | 5/1982 | Thomas et al. | 206/5.1 |
| 4,782,946 | 11/1988 | Pollak | 206/5.1 X |
| 4,852,591 | 8/1989 | Wisotzki et al. | 134/901 X |

Primary Examiner—Philip R. Coe
Attorney, Agent, or Firm—Ladas & Parry

[57] ABSTRACT

A device for cleaning contact lenses includes a cleansing unit which has a cleanser container shaped as an elongated tub, a perforated bottom plate provided in the cleanser container, a perforated top plate superimposed on the perforated bottom plate to hold the contact lenses therebetween, and a top cover detachably engaged with the cleanser container; a motor with a rotary shaft end; an electric control circuit connected to the motor; a blade assembly disposed inside the cleanser container adjacent to the perforated top and bottom plates and being rotated by the rotary shaft end of the motor; and a housing for containing the cleansing unit, the motor, the electric control circuit, and the blade assembly.

5 Claims, 3 Drawing Sheets

DEVICE FOR CLEANING CONTACT LENSES

BACKGROUND OF THE INVENTION

This invention relates to a device for cleaning contact lenses, more particularly to a device which makes use of a more efficient cleaning method.

A conventional contact lenses cleaning device is shown in FIGS. 1A, 1B. A gear mechanism A is used to rotate a transverse lever arm B. A pair of contact lens containers C, D are rotatably hinged to opposite ends of the transverse lever arm B. In the cleansing process, the contact lenses are placed inside the lens containers C, D before the lever arm B and the lens containers C, D are submerged into a container E filled with contact lens cleaning solution. The lens containers C, D have perforations C1, D1 to allow circulation of the cleansing solution in and out of the same. The gear mechanism A rotates the lever arm and the lens containers C, D in an alternating clockwise and counter clockwise direction to agitate the cleansing solution and thus rinse the contact lenses. The main drawbacks of the conventional cleaning device are as follows:

(1) The agitation of the cleansing liquid is caused by the alternating movement of the lever arm B and the lens containers C, D. Since the gear mechanism A is driven by a small motor, not enough agitation is caused to the cleansing liquid to effectively rinse the contact lenses.

(2) Referring to FIG. 1C, as the lever arm B rotates in the container E, only the side of the contact lens F adjacent to the perforations C1, D1 is actually rinsed. Thus, no effective rinsing of the contact lenses is accomplished.

SUMMARY OF THE INVENTION

Therefore, an object of this invention is to provide a more effective device for cleaning contact lenses.

Another object of this invention is to provide a device for cleaning contact lenses which has an improved housing to include a pincers compartment for receiving and storing a pair of pincers used for handling contact lenses, and a lens storage case for storing contact lenses when not in use.

Accordingly, the preferred embodiment of a device for cleaning contact lenses in this invention comprises a cleansing unit which includes a cleanser container shaped as an elongated tub, a perforated bottom plate provided in the cleanser container, a perforated top plate superimposed on the perforated bottom plate to hold the contact lenses therebetween, and a top cover detachably engaged with the cleanser container; a motor with a rotary shaft end; an electric control means connected to the motor; a blade assembly disposed inside the cleanser container adjacent to the perforated top and bottom plates and being rotated by the rotary shaft end of the motor; and a housing for containing the cleansing unit, the motor, the electric control means, and the blade assembly. The housing has an accommodating space for receiving the cleansing unit, a drawer-type lens storage case adjacent to the accommodating space and used as a storage space for contact lenses when not in use, and a pincers compartment for receiving and storing a pair of pincers to be used for handling contact lenses.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENT

Figure 1A:
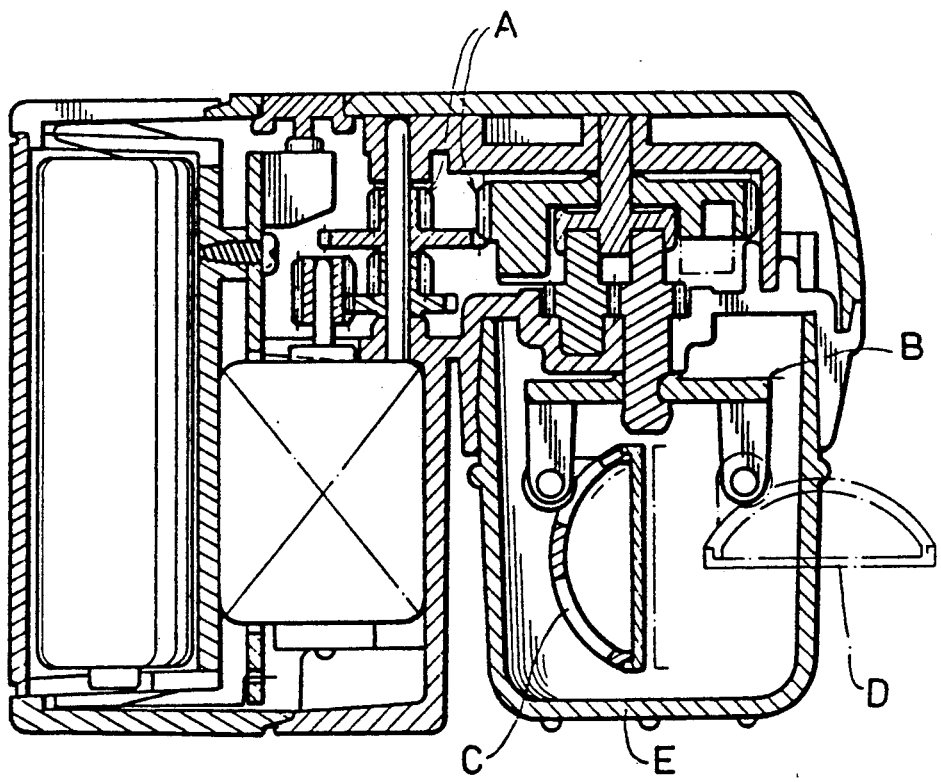
FIGS. 1A, 1B, 1C are illustrations of a conventional contact lens cleaning device.
Figure 1B:
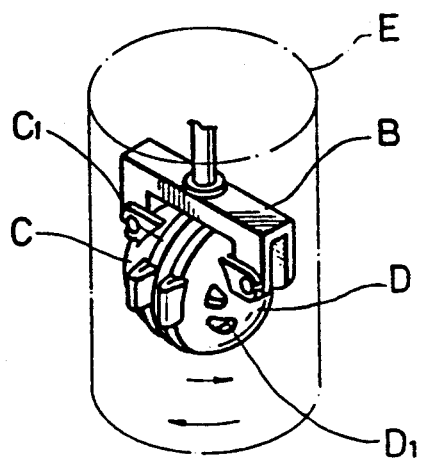
Figure 1C:
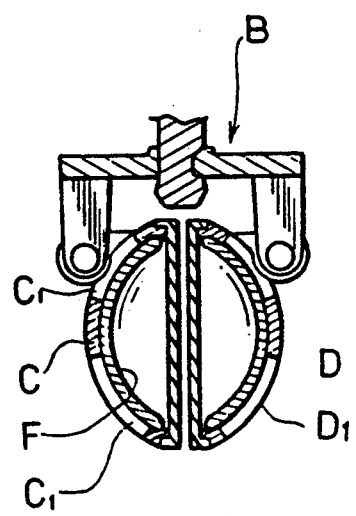
Figure 2:
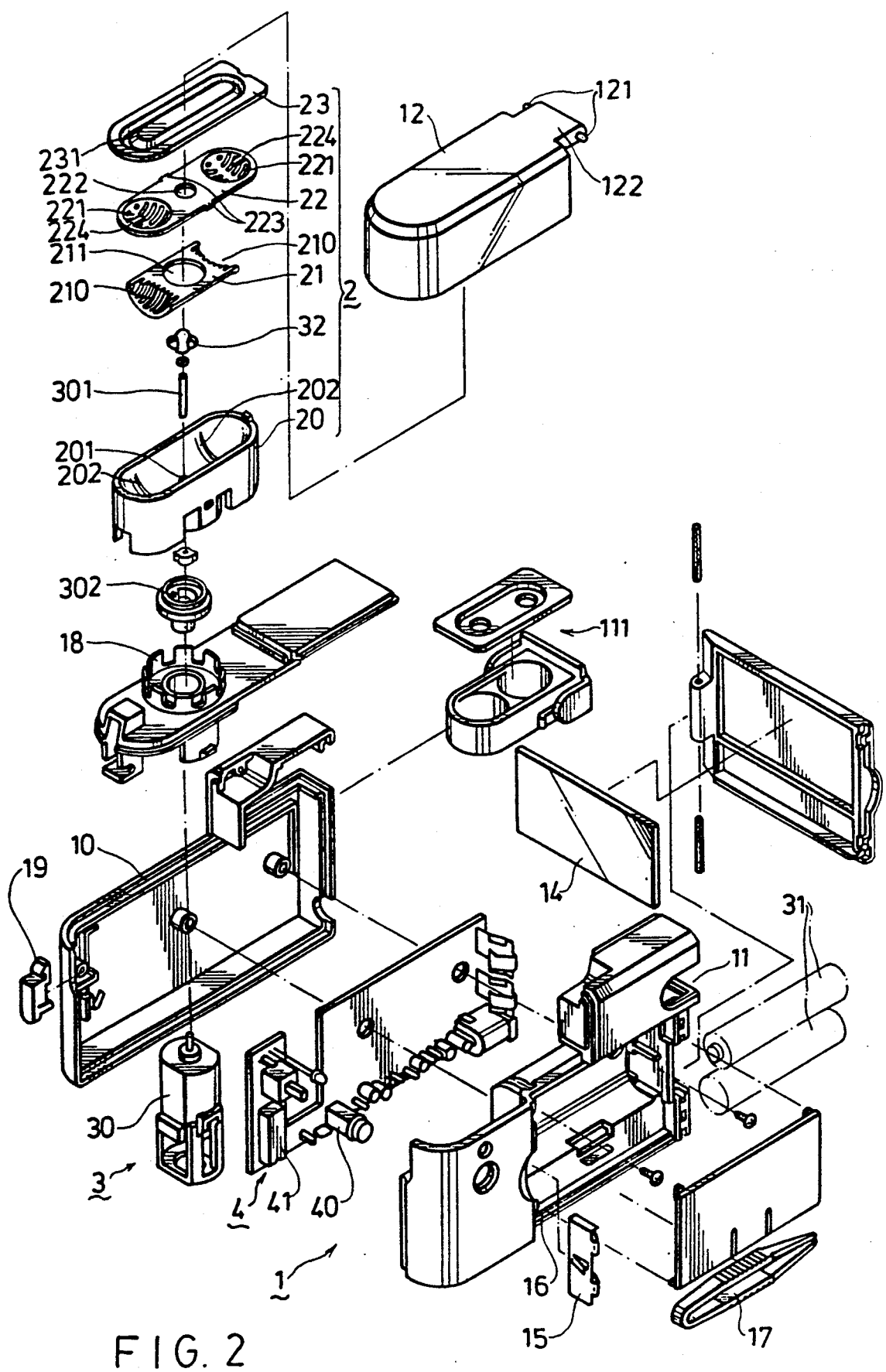
FIG. 2 is an exploded view of the preferred embodiment of a contact lens cleaning device according to the present invention.
Figure 3:
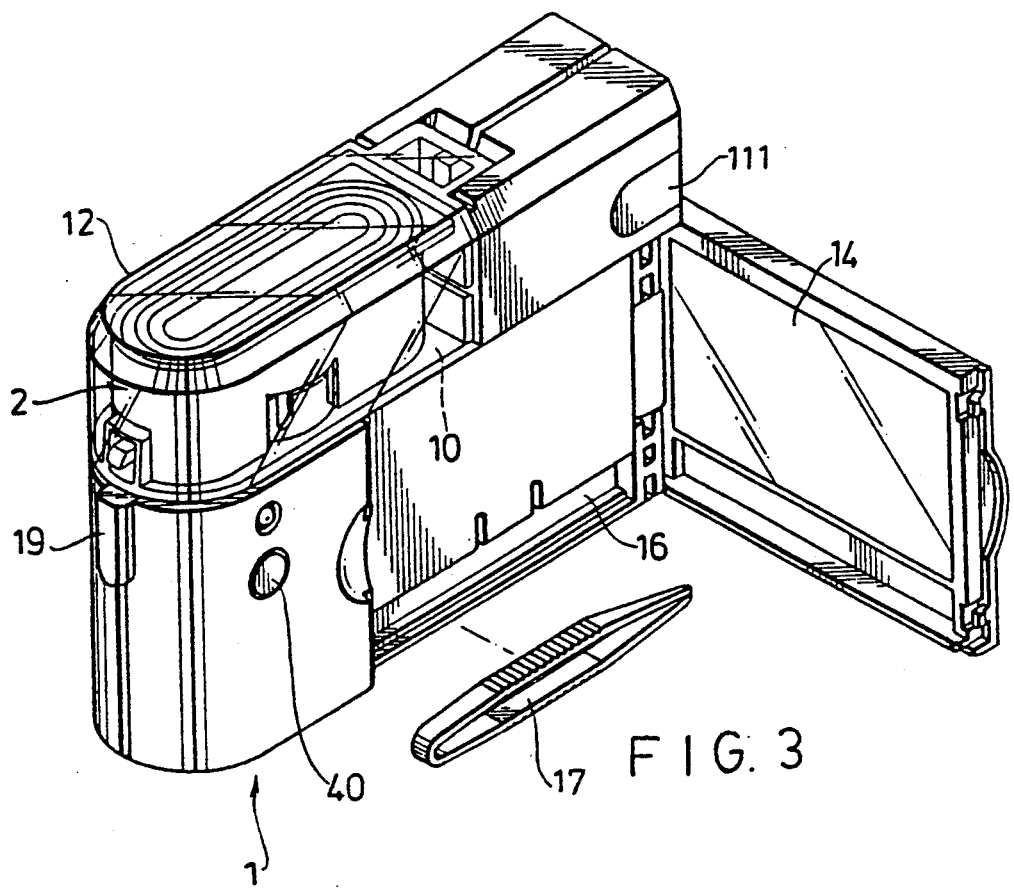
FIG. 3 illustrates the preferred embodiment in an assembled condition.

Referring to FIG. 2, an exploded view of a preferred embodiment of a device for cleaning contact lenses according to this invention shows the invention to comprise a housing 1, a cleansing unit 2, an actuating means 3, and a control means 4.

The housing 1 has an accommodating space 10 on an upper left hand corner and a drawer-type lens storage case 11 formed on an upper right hand corner. The lens storage case 11 has a drawer 111 which is used as a storage place for contact lenses when not in use. A transparent substantially oval shield 12 has a top surface with a restricted end 122. A pair of hinge posts 121, extending from the restricted end 122 and transverse to the axis of the shield 12, rotatably hinge the shield 12 to the lens storage case 11. The shield 12 may thus be lifted up or down relative to the storage case 11. The housing 1 further has a transparent door 14 rotatably hinged to a vertical wall section and a receiving space for cell means 31 of the actuating means 3. The transparent door 14 serves as a means for accessing the cell means 31 during replacement. The housing 1 further includes a resilient metal bearing plate 15 to position the cell means 31. The housing 1 also has a pincer compartment 16 for receiving a pair of pincers 17 used for handling contact lenses and a support plate 18 extending along the length of the housing 1 at the accommodating space 10. A catch piece 19 acts as a latch for the shield 12 to the support plate 18.

The cleansing unit 2 is mounted to the support plate 18 at the accommodating space 10 and comprises a cleanser container 20, a perforated bottom plate 21, a perforated top plate 22, and a top cover 23. The container 20 is an elongated tub and has a concavity shaped as a longitudinal half of a substantially ellipsoidal hollow body with a central hole 201 formed therein. The bottom plate 21 has a flat central section and a pair of concave portions 210 whose ends engage with grooves 202 formed in the container 20. The concave portions 210 and portions of the container 20 are complimentary and form a substantially hemispherical recess for receiving contact lenses. The bottom plate 21 further has a central circular hole 211 which is concentric with the central hole 201 of the container 20 about a common axis. The top plate 22 is formed as an elliptical plate with two opposing concave portions 221 which are similarly slit. The top plate 22 also has a central circular hole 222 which is similarly concentric with the circular hole 211 of the bottom plate 21 about the common vertical axis. The circular hole 222, however, has a diameter which is substantially smaller compared to the circular hole 211 of the bottom plate 21. The top plate 22 further includes a pair of oppositely disposed flange ears 223 resting on the top edges of the container 20 and a pair of tongue projections 224 having a portion extending above the recesses 221. The top cover 23 is similarly formed as an oval plate with a looped elliptical downward projection 231. When assembled, the central section of the bottom plate 21 abuts with the top plate 22. The top cover 23 exerts a downward pressing force on the tongue projections 224 to hold the top plate 22 in place.

The actuating means 3 comprises a motor 30, a cell means 31, and a blade assembly 32. The motor 30 is disposed inside the housing 1 and has a rotating shaft end connected to a rotary base 302 rotatably seated in the support plate 18. A rod 301 has a lower end connected to the rotary base 302 and an upper end connected to the blade assembly 32. The rod 301 passes through the central hole 201 of the container 20 and rotates with the rotary base 302. The blade assembly 32 is thus rotated by the rod 301.

The electric control means 4 comprises a push button switch 40 electrically connected to a circuit 41 and is disposed inside the housing 1. The circuit 41 is electrically connected to and drives the motor 30.

The preferred embodiment is shown in its assembled form in FIG. 2. The catch piece 19 is pressed to unlock the shield 12 against the support plate 18 when lifting the shield 12 to access the container 20.

Figure 4:
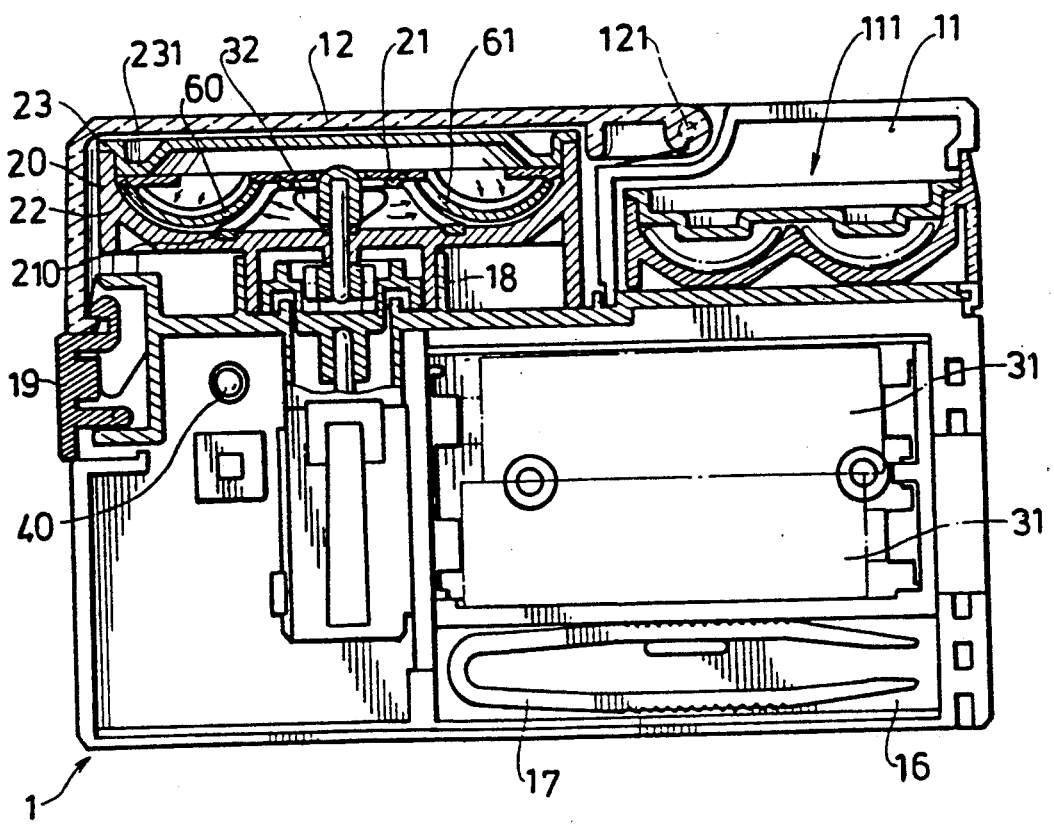
FIG. 4 is a sectional view showing the operation of the preferred embodiment.

Referring to FIG. 4, the operation of the preferred embodiment is as follows: Once the shield 12 is raised, the top cover 23 is removed and each of the contact lenses 60, 61 to be cleansed is placed between the perforated top plate 22 and the perforated bottom plate 21. The container 20 is filled with cleansing liquid before the top cover 23 is properly repositioned. When the push button switch 40 is switched on, electric power is supplied by the circuit 41 to drive the motor 30 and rotate the rod 301. The rotation of the rod 301 correspondingly rotates the blade assembly 32, agitating the cleansing liquid contained inside the container 20. The cleansing liquid is thus circulated between the top plate 22 and the bottom plate 21. The movement of the cleansing liquid inside the container 20 effectively rinses the contact lenses 60, 61. The top cover 23 prevents the cleansing liquid from spilling out of the container 20.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:
1. A device for cleaning contact lenses, comprising:
   a cleaning unit including a cleanser container shaped as an elongated tub, a perforated bottom plate provided in said cleanser container, a perforated top plate superimposed on said perforated bottom plate to hold the contact lenses therebetween, and a top cover detachably engaged with said cleanser container;
   a motor with a rotary shaft end;
   an electric control means connected to said motor;
   a blade assembly disposed inside said cleanser container adjacent to said perforated top and bottom plates and being rotated by said rotary shaft end of said motor; and
   a housing for containing said cleansing unit, said motor, said electric control means, and said blade assembly, and wherein said housing comprises an accommodating space for receiving said cleansing unit, and a drawer-type lens storage case adjacent to said accommodating space and used as a storage space for contact lenses when not in use.
2. A device as claimed in claim 1, wherein said housing further comprises a pincers compartment for receiving a pair of pincers to be used for handling contact lenses.
3. A device as claimed in claim 2, further comprising a shield hinged to said housing above said accommodating space.
4. A device as claimed in claim 1, wherein said top cover of said cleansing unit has a downward projection for exerting a pressing force on said perforated top plate.
5. A device as claimed in claim 1, wherein said perforated bottom plate has a pair of slitted first concave portions, said perforated top plate has a pair of slitted second concave portions superimposed on said first concave portions.

* * * * *